United States Patent [19]

Lachaize

[11] 4,177,694

[45] Dec. 11, 1979

[54] TRANSMISSION MECHANISM WITH HYDROKINETIC COUPLING DEVICE AND REVERSING DEVICE

[75] Inventor: Henri G. Lachaize, Fontenay-aux-Roses, France

[73] Assignee: Société Anonyme Automobiles Citroen, Paris, France

[21] Appl. No.: 830,995

[22] Filed: Sep. 6, 1977

[30] Foreign Application Priority Data

Sep. 9, 1976 [FR] France .................................. 76 27171

[51] Int. Cl.² ............................................ F16H 3/44
[52] U.S. Cl. .................................... 74/732; 192/3.22; 192/3.27; 74/792; 74/730
[58] Field of Search ................. 74/732, 730, 792, 789; 192/3.22, 3.27, 18 A

[56] References Cited

U.S. PATENT DOCUMENTS

| 2,883,021 | 4/1959 | Hill | 192/18 A |
|---|---|---|---|
| 2,885,909 | 5/1959 | Mooney | 192/18 A |

Primary Examiner—Samuel Scott
Assistant Examiner—Gery Anderson
Attorney, Agent, or Firm—Bacon & Thomas

[57] ABSTRACT

Transmission mechanism located between a driving shaft and a driven shaft and comprising a hydrokinetic coupling device and a device for reversing the rotation direction of the driven shaft.

The hydrokinetic device comprises a driving wheel and a driven wheel, whereby the latter can be coupled to the driven shaft by means of a reversing device constituted by a planet gear, comprising planet wheels and bevel gears, located substantially in the center of the hydrokinetic device via hydraulically controlled coupling means and located on either side of the hydrokinetic device, whereby the driving and driven wheels, reversing device and coupling means are all located in a fluid-filled enclosure.

An interesting application of the invention is to the automobile industry.

7 Claims, 1 Drawing Figure

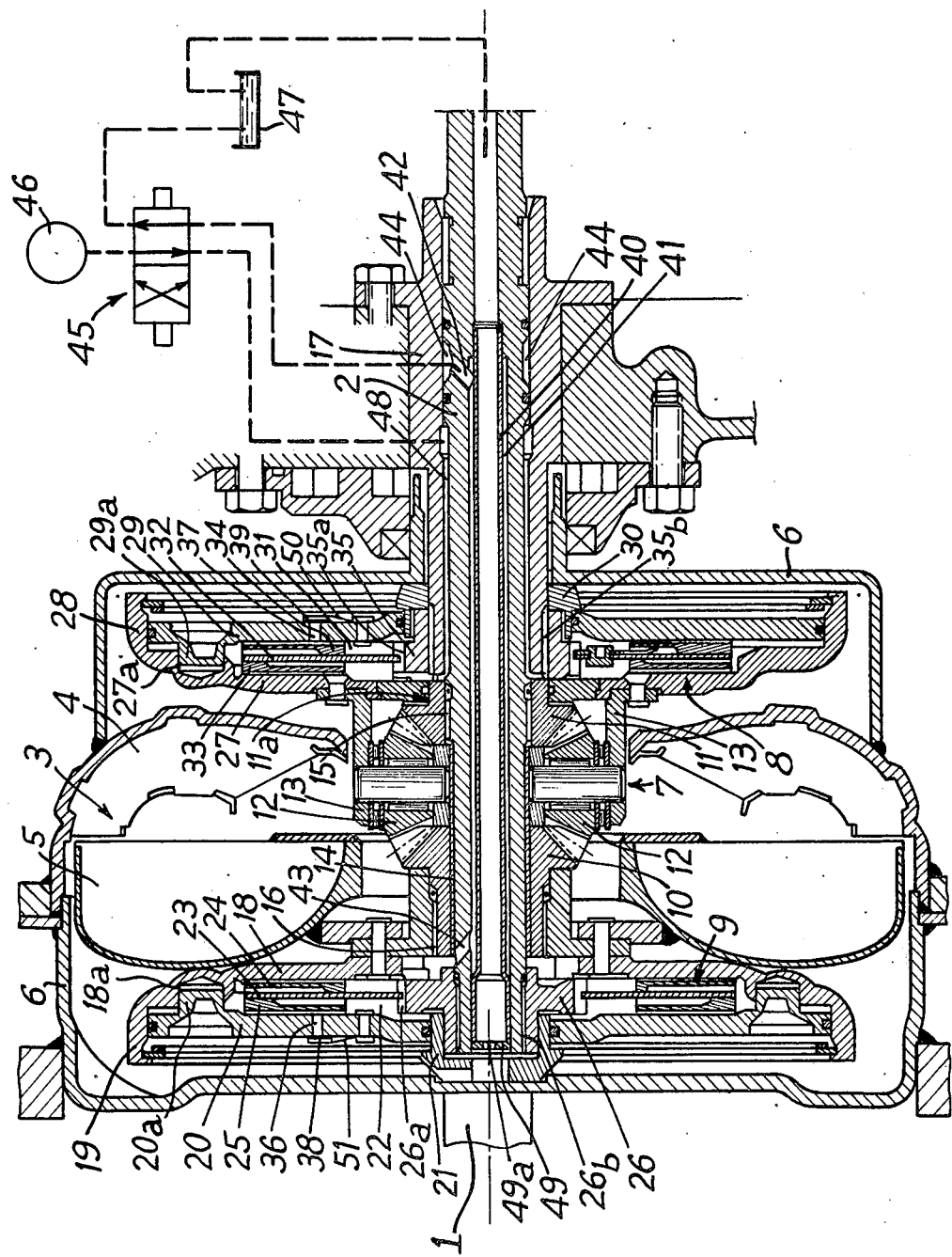

TRANSMISSION MECHANISM WITH HYDROKINETIC COUPLING DEVICE AND REVERSING DEVICE

BACKGROUND OF THE INVENTION

The present invention relates to a hydromechanical transmission mechanism, more particularly for an automobile, in which between a driven shaft and a driving shaft are located a hydrokinetic coupling device of the hydraulic coupler or torque converter type and a reversing device.

More specifically, the invention relates to a transmission mechanism in which the hydrokinetic coupling device and the reversing device are located in a same fluid-filled enclosure, whilst the coupling means between the hydrokinetic device, the reversing device and the driven shaft govern the forward-reverse gear transmission operating conditions.

Among the known devices of this type, there are those in which the reversing device comprises a planetary gear having a central gear wheel, an external toothed rim and planet wheels which mesh with said wheel and said rim.

The central gear wheel is fixed to the driven part of the hydraulic coupling device, the rim is fixed to the driven shaft and the planet wheels are mounted on a planet wheel holder which can either be fixed by means of appropriate coupling means or can rotate with the planet wheels.

Thus, respectively, the reverse gear and forward gear of the transmission are obtained.

One of the disadvantages of these known devices is that such a reversing mechanism does not give the same transmission ratio in reverse gear and forward gear. Moreover, the arrangement of the wheel, planet wheels and rim has very considerable overall radial dimensions, making it necessary to position the reversing mechanism alongside the hydraulic coupling device, therefore increasing the overall axial dimensions of the transmission mechanism.

BRIEF SUMMARY OF THE INVENTION

The present invention aims at obviating these disadvantages and proposes a hydromechanical transmission mechanism of the type indicated hereinbefore in which the arrangement of the coupling device and reversing device is such that it is advantageously possible to obtain the same transmission ratio both in forward and reverse gear, in a simple construction of reduced overall axial dimensions.

To this end, the invention has for its object a transmission mechanism, more particularly for an automobile, arranged between a driven shaft and a driving shaft, comprising a hydrokinetic coupling device and a reversing device, said hydrokinetic device being constituted by a fluid-filled enclosure fixed to the driven shaft and internally carrying a driving wheel and a driven wheel which faces said driving wheel and which can be coupled to the driven shaft by means of a reversing device located in said enclosure and via hydraulically controlled coupling means also located in said enclosure, wherein the reversing device comprises a planetary gear of bevel wheels located substantially in the centre of said hydrokinetic device.

According to a preferred embodiment of the invention, the said planetary gear comprises a first bevel wheel fixed to the driven wheel, a second bevel wheel fixed to the driven shaft and at least one planet wheel carried by a planet wheel holder and meshing with said first and second bevel wheels. Furthermore, the said coupling means are fitted in such a way that they selectively render reciprocally immobile the first and second bevel wheels as well as the planet wheel holder and the planet wheels carried by the same, thus defining the forward gear position of the reversing device and immobilise the planet wheel holder, thus defining a reverse gear position of said reversing device. Advantageously, the forward and reverse gear positions of the reversing device are obtained by the selective engagement of two friction clutch systems, extending on either side of the planetary gear. To this end the forward gear clutch system comprises a radial plate fixed to the first bevel wheel and a piston which is axially movable relative to the plate and defining with it a chamber of variable volume into which extends a clutch disk which rotates with the driven shaft. The reverse gear clutch system comprises a radial plate fixed to the planet wheel holder and a piston which is axially movable relative to said plate and defining with it a chamber of variable volume into which extends a clutch disk which rotates with a fixed part of the mechanism.

According to an advantageous embodiment, the face of each piston opposite to that turned towards said chamber is subject to the fluid pressure in the enclosure. Moreover, each chamber is selectively connected to a pressurized fluid source and to a reservoir in such a way that when one communicates with the source the other communicates with the reservoir and vice versa, and communicates with the enclosure via a non-return valve which permits the passage of fluid from the chamber to the enclosure.

BRIEF DESCRIPTION OF THE DRAWING

Other and further objects of the present invention will be apparent from the description and claims and are illustrated in the accompanying drawing which, by way of illustration, shows a preferred embodiment of the present invention and the principles thereof and what are now considered to be the best modes contemplated for applying these principles. Other embodiments of the invention embodying the same or equivalent principles may be used and structural changes may be made, if desired, by those skilled in the art without departing from the invention and the scope of the appended claims.

The attached drawing shows in section a preferred embodiment of the invention.

DETAILED DESCRIPTION OF THE PREFERRED EMBODIMENTS

The drawing shows the hydromechanical transmission mechanism disposed between on the one hand a driving shaft 1, for example an automobile crankshaft and on the other hand a driven shaft 2, coaxial to shaft 1 and which serves to drive in known manner the vehicle driving members such as wheels, caterpillars, etc. Said mechanism comprises a hydraulic coupler 3 constituted by a driving wheel 4 or pump and driven wheel 5 or turbine. The driving wheel 4 is in one piece with an enclosure 6 into which it extends. This enclosure which is filled with fluid by means of supply ducts, to be described hereinafter, is fixed to the driving shaft 1.

Said mechanism also comprises a transmission reversing device constituted by a planetary gear 7, whose forward and reverse gear operation is governed by coupling means 8 and 9, which in this case comprise friction clutches. It should be noted that members 7, 8 and 9 are located in enclosure 6.

Planetary gear 7 is constituted by a first bevel gear 10 or input gear, a second bevel gear 11 or output gear and planet wheels 12 mounted on a planet wheel holder 13 and meshing with bevel gears 10 and 11. Bevel gear 10 is mounted so as to rotate freely on a ring 14, carried on the outside of shaft 2. Bevel gear 11 cooperates in rotation with a shaft 2 by means of grooves 15. The planet wheel holder 13 rotates freely and is centred on a cylindrical bearing 11a of bevel gear 11.

The driven wheel 5 or turbine of device 3 is linked in rotation with bevel gear 10 by grooves 16. It should be noted that planetary gear 7 is located substantially in the centre of the hydraulic coupling device 3. It should also be noted that shaft 2 is kept centred relative to enclosure 3 and therefore aligned relative to shaft 1 by means of a guidance sleeve 17 fixed to part of the mechanism, such as a gear box.

Opposite to the wheel or pump 4, turbine 5 carries a radial plate 18 whose end is shaped to form a substantially cylindrical axial portion 19 so as to constitute a laterally open slot. A plate piston 20 centred on a ring 21 slides axially on part 19 into the said slot so as to constitute a variable volume chamber 22. The axial sliding of said piston 20 relative to plate 18 is also guided by cylindrical studs 20a which can slide into blind holes 18a provided in corresponding manner in plate 18. In addition, members 18a and 20a ensure an immobilization in rotation of piston 20 relative to plate 18.

A friction disk 23 carries friction linings 24 and 25 in chamber 22. Disk 23 can be engaged on the outer groove portion 26a of a ring 26 which itself cooperates by grooves 26b with shaft 2.

The planet wheel holder 13 is provided with a plate 27 which is virtually symmetrical to plate 18 relative to the hydrokinetic device. Plate 27 also has an outer axial extension 28 which constitutes a sliding bearing of a plate piston 29 centered on a ring 30. Studs 29a and cylindrical recesses 27a provided in corresponding manner on said piston and said plate complete the guidance of the piston on the plate and ensures its relative immobilization in rotation. Thus, with plate 27, piston 29 defines a variable volume chamber 31 into which extends a friction disk 32. The disk carries lines 33 and 34 which cooperate with plate 27 and piston 29 and is also centrally engaged on the outer grooved portion 35a of a ring 35, cooperating with the fixed member 17 via internal grooves 35b.

Moreover, each of the pistons 29 and 20 is provided with an orifice 37 and 36. Orifice 36 links chamber 22 with the inside of enclosure 6 and the presence of a non-return valve 38 only authorises this connection in the direction from chamber 22 towards enclosure 6.

In the same way, orifice 37, equipped with a non-return valve 39, authorises a communication between chamber 31 and the inside of enclosure 6, but only in the direction from the former towards the latter.

The driven shaft 2 is hollow and within said shaft is located a tubular sleeve 40 defining over at least part of the shaft length a peripheral duct 41 which connects a fluid supply opening 42 to a fluid discharge opening 43. Opening 42 issues into a groove 44 made within shaft 2, said groove being in selective communication via a control distributor 45 with a pressurized fluid source 46 and a reservoir 47. Opening 43 communicates with chamber 22. Moreover, between shaft 2 and sleeve 17 a peripheral duct 48 is provided, which establishes a connection between chamber 31 and selectively by means of distributor 45 source 46 and reservoir 47. The selection of the connections effected by distributor 35 is such that when chamber 22 is connected to source 46, chamber 31 is connected to reservoir 47 and vice versa.

Finally, a calibrated leakage port 49a provided in the base wall 49 of tubular sleeve 40 permits a flow of the fluid contained in enclosure 6 within shaft 2 towards reservoir 47.

The device according to the invention functions in the following manner. In forward gear, distributor 45 is arranged in such a way that duct 48 is connected to fluid source 46 and duct 42 to reservoir 47, so that pressurized fluid is admitted into chamber 31. This fluid then flows via orifice 37 into enclosure 6, thereby raising non-return valve 39 equipped with a return spring 50. This flow is possible due to the permanent leakage of the fluid contained in the enclosure via calibrated port 49a which makes it possible to maintain a certain pressure in the hydrokinetic device and also constitutes a cooling system for the device. The internal pressure of chamber 31 is higher than that in enclosure 6, due to the slight pressure drop via valve 39. This pressure forces back piston 29 axially, moving it away from plate 27 in such a way that no engagement of disk 32 takes place.

At the same time, as a result of the system of connections relative to distributor 45, chamber 22 is connected to reservoir 47 (opening 43, duct 41, opening 42 and groove 44). The pressure in enclosure 6 acts on piston 20 in such a way that it is forced against plate 18. Thus, disk 23 is engaged between plate 18 and piston 20. Plate 18 then rotates with disk 23 and, via ring 26, with shaft 2. Thus, bevel gears 10 and 11 are linked in rotation. The torque transmitted to turbine 5 is thus transmitted to shaft 2 by disk 23 and ring 26, whereby bevel gear 10, planet wheels 12 and bevel gear 11 rotate in unison.

In reverse gear, the distributor 45 is positioned in such a way that source 46 supplies via groove 44 opening 42, duct 41 and opening 43 in chamber 22, whilst chamber 31 is connected to reservoir 47 via duct 48.

As non-return valve 38 is also equipped with a return spring 51 for its seat, the flow of fluid from chamber 22 towards the inside of enclosure 6 takes place via duct 36 with a pressure drop due to the return load acting on the non-return valve. Thus, a pressure is formed in chamber 22 which is higher than that in enclosure 6. This pressure difference has the effect of forcing back piston 20, moving it away from plate 18 in such a way that there is no engagement of friction disk 23. As at the same time chamber 31 is exhausted, the fluid contained in enclosure 6 acts on piston 29, forcing it against plate 27. Fixed disk 32 is thus engaged between plate 27 and piston 29. Thus, plate 27 is fixed relative to sleeve 17. As planet wheel holder 13 is integral with plate 27 it is also fixed and the planet wheels 12 which it carried in freely rotatable manner are driven by bevel gear 11 which is rotated by turbine 5. Thus, the planet wheels rotate bevel gear 12, which is integral in rotation with shaft 2, in a rotation direction which is opposite to that of bevel gear 11. Thus, shaft 2 is rotated in the opposite direction to turbine 5. However, it should be noted that the rotation speed in the reverse gear sense of shaft 2 is identical to that in the forward gear sense. This arrangement is advantageous, particularly in certain vehicles where the forward and reverse gear are used in a symmetrical manner.

It is apparent that the components according to the invention are positioned very close together, which makes it possible to obtain an axially very compact construction of a hydrokinetic reversing device assembly. An important application of the invention is to the automobile industry.

It is not limited to the description given hereinbefore, but in fact covers all variants which could be made thereto without passing beyond the scope of the invention. Thus, coupling devices 8 and 9, whilst still being hydraulically controlled, can be constituted by claw flange coupling mechanisms or, in the case of friction devices, can comprise stacks of disks.

What is claimed is:

1. A transmission mechanism, more particularly for an automobile, disposed between a driving shaft and a driven shaft comprising in a fixed support structure, a hydrokinetic device for coupling said driving and driven shafts, said device including a closed enclosure provided with a driving wheel therein remote from said driving shaft, said enclosure being rigidly locked with said driving shaft and fluid-filled, a driven wheel located within said enclosure adjacent of said driving wheel and which can be coupled to an end of said driven shaft located in said enclosure and in axial alignment with said driving shaft by means of a reversing device comprising a planetary gear set of bevel gears located substantially at the center of the enclosure and the driving gear of which is keyed to said driven wheel, the driven gear of which is keyed on said driven shaft, said driving gears meshing with at least one planet wheel carried by a planet wheel holder which is freely rotatable with respect to the driven shaft, the coupling of said driving wheel and said driven shaft being controlled by hydraulically controlled coupling means located in said enclosure between said driving gear and said driven shaft and between said planet wheel holder and a part of said fixed support structure.

2. Mechanism according to claim 1 wherein said hydraulically controlled coupling means are adapted to be controlled in order to, selectively, connect in rotation, said driving, driven planet gears and said planet wheel holder thus permitting rotation of driven shaft in the same sense of driving shaft rotation and to fix said planetwheel holder thus permitting a reverse driven shaft rotation with respect to driving shaft rotation.

3. Mechanism according to claim 2 wherein said hydraulically controlled means are constituted by two friction clutch systems extending on either side of the planetary gear and of said wheels.

4. Mechanism according to claim 3, wherein the forward clutch system includes a radial plate integral with said driving bevel gear and a piston which is axially movable relative to said plate and defining therewith a variable volume chamber into which extends a clutch disk keyed in the driven shaft.

5. Mechanism according to claim 4, wherein the reverse gear clutch system comprises a radial plate integral with the planet wheel holder and a piston which is axially movable relative to said plate and defining therewith a variable volume chamber into which extends a clutch disk which is keyed on said part of said fixed support structure.

6. A transmission mechanism as claimed in claim 5, wherein the face of each piston remote from the chamber is subject to the action of the fluid pressure in the enclosure.

7. A transmission mechanism as claimed in claim 6, wherein each chamber is connected selectively to a pressurized fluid source and to a reservoir in such a way that when one is connected to the source the other is connected to the reservoir and vice versa and is connected with the enclosure via a non-return valve which authorizes the passage of fluid from said chamber to the enclosure.

* * * * *